United States Patent

Peters

[15] 3,701,109

[45] Oct. 24, 1972

[54] PRIORITY ACCESS SYSTEM

[72] Inventor: Theodore Richmond Peters, Bernardsville, N.J.

[73] Assignee: Bell Telephone Laboratories, Incorporated, Murray Hill, Berkeley Heights, N.J.

[22] Filed: Nov. 9, 1970

[21] Appl. No.: 87,980

[52] U.S. Cl. ........................................340/172.5
[51] Int. Cl. ........................................G06f 9/18
[58] Field of Search ........................................340/172.5

[56] References Cited

UNITED STATES PATENTS

| | | | |
|---|---|---|---|
| 3,543,242 | 11/1970 | Adams et al. | 340/172.5 |
| 3,331,055 | 7/1967 | Betz et al. | 340/172.5 |
| 3,413,612 | 11/1968 | Brooks et al. | 340/172.5 |
| 3,303,476 | 2/1967 | Moyer et al. | 340/172.5 |
| 3,425,037 | 1/1969 | Patterson et al. | 340/172.5 |
| 3,456,244 | 7/1969 | Seichter et al. | 340/172.5 |
| 3,500,329 | 3/1970 | Couleur et al. | 340/172.5 |
| 3,508,206 | 4/1970 | Norberg | 340/172.5 |
| 3,513,445 | 5/1970 | Harmon et al. | 340/172.5 |
| 3,534,339 | 10/1970 | Rosenblatt | 340/172.5 |
| 3,553,656 | 1/1971 | Bernhardt | 340/172.5 |

*Primary Examiner*—Paul J. Henon
*Assistant Examiner*—Ronald F. Chapuran
*Attorney*—R. J. Guenther and William L. Keefauver

[57] ABSTRACT

Methods and apparatus are described which provide for granting access to a computer or other system to a plurality of users having different priorities. Each user is assigned to a priority group within which all users receive sequential access. Priority groups as a whole are granted access in accordance with their usage requirement and associated relative priorities. Each group is assured access for at least a minimum period within a longer reference period.

14 Claims, 5 Drawing Figures

INVENTOR
T. R. PETERS
BY William Ryan
ATTORNEY

PRIORITY ACCESS SYSTEM

Government Contract

The invention herein claimed was made in the course of or under a contract with the Department of the Army.

This invention relates to data processing systems. More particularly, the present invention relates to data processing systems including means for sharing one or more functional elements among a number of potentially conflicting uses. Still more particularly, the present invention relates to methods and apparatus for efficiently sharing the use of a common functional unit among a plurality of users each having an assigned priority.

BACKGROUND AND PRIOR ART

The use of shared facilities in many information handling and processing operations is well-known. The switched telephone network is perhaps the most universal example of a common facility shared among a (usually large) number of users. In more recent times computers and other types of data processing systems have been found to be amenable to shared usage by a number of individual users.

Common to all shared access facilities is the notion of priorities. It is clear that among the several users requesting access to a digital computer, for example, there may be those having a greater need for immediate response. At a minimum, it may be desired that a user currently being served be permitted to complete a prescribed period of service even though a new request for service may arrive. In the course of processing in real time data processing systems it is often true that some input requests simply cannot be denied immediate access. Other users, however, may have a less immediate need for access to the computational or other facilities of a data processing system. Often, such latter users constitute a so-called background load for a system which may include as well provision for responding to those users having more immediate needs.

Since at a fundamental level each functional unit of a data processing or similar system (which facilities may include, for example, a memory or a central processor) is desirably not replicated for each user, some conflict is often inevitable. That is, unless particular provision is made for receiving and simultaneously responding to two or more requests, some provision must be made to give one request immediate access and to defer other requests at least temporarily. Such techniques are characterized as interrupt or trap mode techniques and are described, for example, in Computer Organization by I. Flores, Prentice-Hall, Englewood Cliffs, New Jersey, 1969, especially chapters 3 and 4. Particular systems including provision for priority interrupt operation include those described in U.S. Pat. Nos. 3,425,037 issued Jan. 28, 1969, to C. D. Paterson et al; 3,513,445 issued May 19, 1970, to S. A. Harmon et al; 3,413,613 issued Nov. 26, 1968, to D. L. Bahrs et al; 3,490,003 issued Jan. 13, 1970, to H. L. Herold et al; and 3,500,329 issued Mar. 10, 1970, to J. F. Couleur et al. Systems involving these general techniques are also described in British Pat. Specifications Nos. 1,193,719 and 1,193,720 published June 3, 1970.

One common means for assigning priorities and directing access to a common functional unit in a data processing system is a so-called data channel. Such data channels are described in the book by Flores, supra, in chapter 2. The purpose of a data channel generally is to alleviate the need for involving a central processor for performing the routine monitoring and supervisory functions associated with inputs, outputs and access to a memory or similar functional unit. A particular example of a data channel (or channel controller as it is sometimes referred to) is the IBM 2909 Asynchronous Data Channel.

The several systems mentioned above each may include provision for assigning priorities to each of two or more inputs or outputs. It often happens, however, that although lower priority requests are not as urgent as higher priority requests, responses to such lower priority requests nevertheless cannot be postponed indefinitely.

Accordingly, it is an object of the present invention to provide apparatus and methods for granting access to a common functional unit by each of a plurality of individual requesters.

It is a further object of the present invention to provide for the granting of access to a common functional unit to each of several users in accordance with preassigned priorities.

It is a further object of the present invention to provide for apparatus and methods for meeting accessibility requirements for a range of users having varying priorities while preventing permanent lockout of low priority users.

SUMMARY OF THE INVENTION

In accordance with a preferred embodiment of the present invention, each of a plurality of users is assigned to one of N groups, the priorities within each group being equal. Priorities for each group are different, however, from those of each other group. Priorities are assigned to individual groups in accordance with percentages of total required accesses required by each group. A simple access control circuit is provided to monitor and control accessing by each group in accordance with assigned priorities. In accordance with an improved embodiment of the present invention each user group is assigned a priority based on relative time usage, rather than merely the relative number of accesses required.

BRIEF DESCRIPTION OF THE DRAWING

A full and complete understanding of the present invention may be had by considering the following detailed description in connection with the attached drawing wherein.

DETAILED DESCRIPTION

Assignment of Priorities

Figure 1:
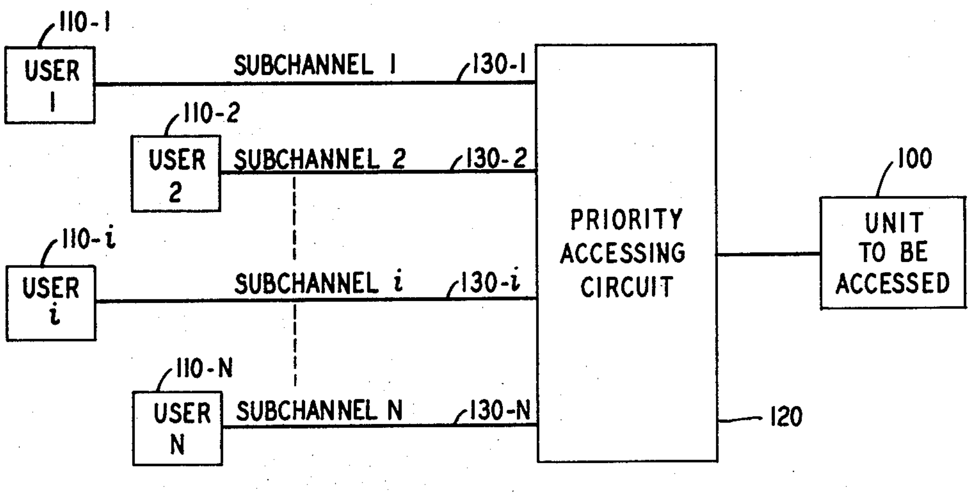
FIG. 1 shows a broad block diagram of a system utilizing the present invention.

The overall arrangement in accordance with one embodiment of the present invention is that shown in FIG. 1. FIG. 1 shows a unit to be accessed, 100 and a plurality of users, 110–1 through 110–N. Each user is connected to unit 100 by way of accessing circuit 120. User 100–*i* ($i = 1, 2, \ldots, N$) is shown connected to accessing circuit 120 by way of a corresponding user subchannel 130–*i*. Unit 100 may comprise a computer, or a portion thereof, or it may comprise any other functional unit to be shared among a plurality of users.

Since an important function of the present invention is to facilitate the accessing by a plurality of users of a single functional element, an important first consideration is the existence of relative priorities. For purposes of example, reference is made to a system having 4 separate access priorities. It should be understood that the total number of users (including other machines) may be very much larger than four. Thus the four priorities to be considered are representative of four classes of service. Accordingly, each of a potentially large number, say N, of users will be considered to be assigned to one of four groups, each group having a corresponding priority. Within each priority grouping all users will be considered to have equal priority.

If one or more users in a group having a relatively high priority were to continuously request access, it is clear that those users having lower priorities would in many prior art systems be permanently and effectively locked out; i.e., they would never gain access to the desired functional unit. The present invention in typical embodiment avoids this type of lockout by assigning priorities, and implementing access based on these priorities, in a more flexible manner. To equitably assign priorities to each of the four groups, it is assumed that some knowledge regarding the nature and extent of usage by members of each group is available or calculable.

Table I shows a typical grouping of users and a description of their typical usage patterns.

TABLE I

| Priority Group | Number of SC | Description |
|---|---|---|
| 1 | 4 | High priority, high potential data volume. |
| 2 | 4 | High priority, low data volume |
| 3 | 4 | Intermediate priority, moderate data volume. |
| 4 | 20 | Low priority, low data volume. |

Here the total number of users (subchannels), N, is taken to be 32. In Table I and hereafter the abbreviation SC is used to indicate user subchannel.

It should be understood, of course, that the characteristics ascribed to each priority group in Table I are merely typical. Each user of the present invention will, of course, adapt the present teachings to his own particular type of usage.

Since an important requisite of servicing a plurality of users 110–1 through 110–N is that the permanent lockout of any user should be avoided, an important consideration is the time devoted during some relatively long period of time to the users in each of the four classes of service shown in Table I. Thus it is useful to formulate some normalized measure of the total service provided for each class of service. If, for example, it is found that users in priority group 1 have a desired number, say $n_1$, of requests during each relatively long reference period (a second, minute, etc.), and the average service time for each request is $T_1$, then the total service time devoted to users from group 1 will on the average be equal to $n_1T_1$. If the duration of the reference period is taken equal to $T_0$, then the average time left for the remaining three groups is equal to $T_0 - n_1T_1$. This procedure may be repeated for assigning a fixed duration for each of the classes of service.

It is clear that the lowest (in the example in Table I, the fourth) priority group is assigned a duration during each reference period which is equal to what is left over after each of the three higher priority groups have been assigned their respective durations.

It is clear that a similar procedure may be derived by assigning fixed durations by inverse order of priorities. Thus a fixed duration may be first assigned to the subchannels included in priority group 4. This duration is then subtracted from a reference period before assigning a fixed duration to successively higher priority groups.

Although average service time $T_1$ was mentioned above as useful in allocating a portion of a reference interval to the users in the first priority group, a preferred embodiment of the present invention is based on maximum service times for users in a given priority group. Thus all users in group 1, for example, are examined as a preliminary step and the user having the largest maximum service time, $t_1$, is identified. The portion of the reference period allocated to serving group 1 users in then taken to be $n_1t_1$, where $n_1$ again represents the desired number of requests by group 1 users. It should be understood that $n_1$ may also be equal to the number of subchannels in group 1, but this latter equality need not prevail.

Although it represents no limitation on the generality of the present invention, it is useful for comparison purposes to take the reference period $T_0$ as equal to one second. Thus, suppose for the example treated in Table I that it should be determined that the ith user group requires $n_i$ assured accesses to unit 100 in FIG. 1, each for a maximum period $t_i$ indicated in Table II.

TABLE II

| $i$ | $n_1$ | $t_i$ (msec) | $n_it_i$ (msec) |
|---|---|---|---|
| 1 | 110 | 4 | 440 |
| 2 | 80 | 4 | 320 |
| 3 | 40 | 4 | 160 |
| 4 | 20 | 4 | 80 |

That is, assume each class of users (each priority group) requires the same maximum access time. The subinterval indicated by product $n_it_i$ in Table II for each value of $i$ may then be assigned to the corresponding priority group. Since group 1 has the highest priority, even though for the present example it includes only 4 SC's, it has assigned to it the largest subinterval (440 msec) within each 1 second reference interval.

One embodiment of the present invention for providing a prescribed number of accesses to a given SC within a prescribed reference period of time will now be discussed. It will be assumed that the required maximum access (service) time is (as shown in Table II) the same for all subchannels, regardless of their relative priorities; modifications to this basic arrangement will be treated subsequently.

The relative duration of the intervals $n_it_i$ assigned to each priority group shown in Table II is used to form a service ratio $r_i = n_it_i/(n_it_i)_{min}$, where $(n_it_i)_{min}$ is the assigned subinterval having smallest duration. The respective service ratios for the groups in Table II are given in Table III.

TABLE III

| $i$ | $r_i$ | $r_i^*$ |
|---|---|---|
| 1 | 5.5 | 6 |
| 2 | 4 | 4 |
| 3 | 2 | 2 |
| 4 | 1 | 1 |

To simplify a circuit arrangement to control the accessing by the SC's, the modified service ratio, $r^*_i$, is introduced as shown in Table III. Thus each non-integer service ratio is rounded to the next higher integer value, $r^*_i$.

The interpretation placed on the values $r^*_i$ is that they indicate the frequency of accessing by SC's in the ith group relative to the lowest priority group. Thus, for example, each of the SC's in group 1 has access to a desired unit six times for each access by any group 4 SC. Alternatively phrased, of each 13 group accesses, group 1 receives 6, group 2 receives 4, group 3 receives 2 and group 4 receives 1. Whenever a given group is granted access, all SC's in that group are granted access in sequence or in accordance with some other predetermined plan.

Circuit Configuration

Figure 2:
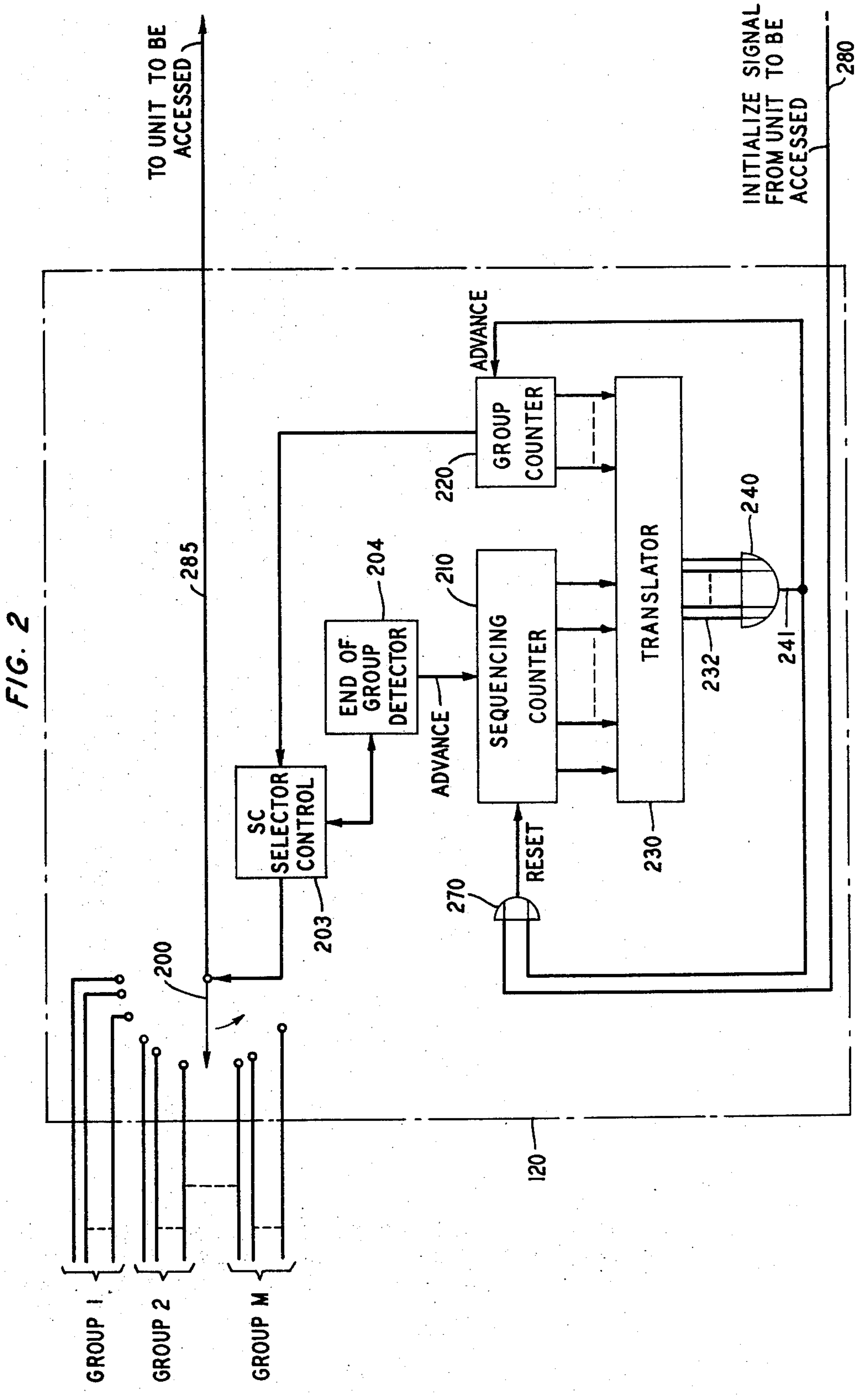
FIG. 2 shows a circuit for monitoring and controlling access to a shared functional unit.

FIG. 2 shows in block diagram form a circuit arrangement suitable for implementing the functions of priority accessing circuit 120 in FIG. 1. FIG. 2 includes a sequencing counter 210 and a group counter 220. Sequencing counter 210 determines the number of times a given group has been accessed during the current reference period. Counter 210 is responsive to advance pulses from end of group detector circuit 204. End of group detector 204 is arranged to provide a pulse suitable for advancing counter 210 at the end of a complete sequential access by all SC's in a given priority group. Group counter 220 prescribes which group is to be granted access currently.

Shown connected to the outputs from counters 210 and 220 is translator 230. Translator 230 is a standard logical translation circuit for generating an output on a particular output lead such as 232 in FIG. 2 whenever a uniquely associated combination is applied at its inputs. The inputs to translator 230 are, of course, indicative of the priority group currently being served (the outputs of counter 220) and the number of times during the current reference period that group has been served. OR gate 240 provides an output on lead 241 whenever any one of its input leads is activated. The output on lead 241 then is applied to the reset input of counter 210 by way of OR circuit 270. The output on lead 241 is also used to advance group counter 220 to its next state.

Figure 3:
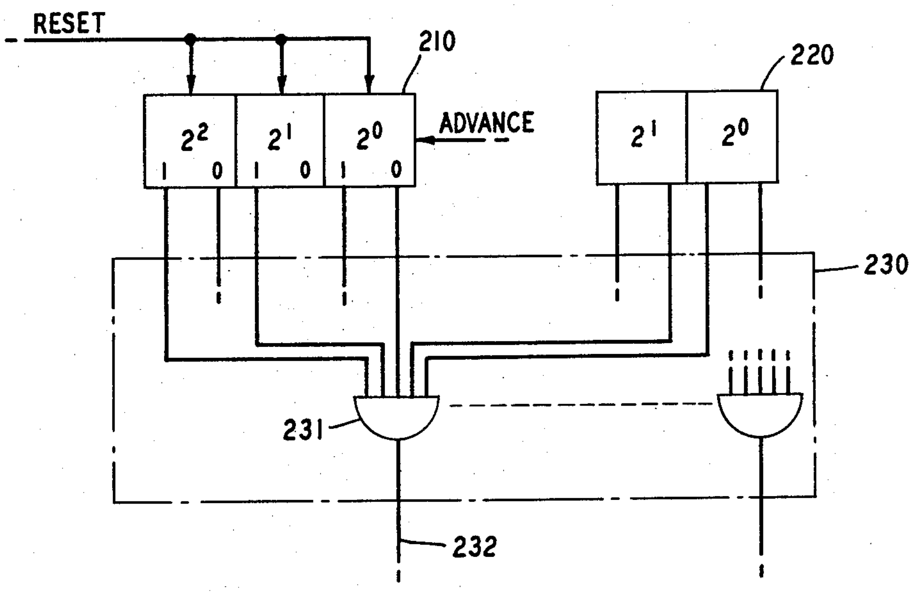
FIG. 3 shows a portion of a counter and translator circuit useful in the circuit of FIG. 2.

FIG. 3 shows a typical portion of translator 230 connected to the operative portions of counters 210 and 220 for the case illustrated in Table III. In particular, AND gate 231 is seen to provide a translation from counter 210 indicative of a count of six whenever counter 220 is in the 00 state. Since it is assumed that counter 210 when reset assumes the all-zero state, the count of six actually indicates the seventh state.

Thus, upon assuming a count of 6, counter 210 is immediately reset to the all-zero state. Since group 1, that associated with the count of six (six group accesses during each cycle of thirteen group accesses), will have just completed receiving its full complement of group accesses at the time that counter 210 is reset, it is appropriate that counter 220 be advanced to its next state. This next state (01) is conveniently that corresponding to priority group 2. An AND gate for priority group 2 then provides an output whenever counter 220 is in the 01 state (indicating group 2) and counter 210 has a count of 100 (indicating that group 2 has received its required 4 group accesses). Similar gates are provided for each priority group. These gates each have their outputs applied as an input to OR gate 240 in FIG. 2.

Returning to FIG. 2, it is noted that upon the completion of each group access counter 210 is advanced 1 state. Whenever counter 210 indicates that the required number of group accesses has been supplied, the count of group counter 220 is advanced to a new state. Counter 210 then counts the number of group accesses for the priority group associated with that new state, and so on. Counter 220 is conveniently provided to be a recycling counter of standard design having a number of states equal to the number of different priority groups. For the case illustrated in Tables II and III, supra, counter 220 is a 2-stage binary counter having four states and providing a return to the 00 state following an advance from the 11 state. If other than an L-stage binary counter having a maximum count of $2^L$ is used, appropriate well-known resetting arrangements are used.

The actual selection of SC's to be connected to unit 100 is performed by input selector 200 in FIG. 2. While shown schematically as a rotating contact, it should be understood that selector 200 in a preferred embodiment comprises an array of AND circuits, one for each SC, with one input connected to the SC and one input connected to SC selector control circuit 203. The outputs of these AND gates are, of course, connected typically by way of an OR gate (not shown) to lead 285 in FIG. 2.

Selector control circuit 203 in appropriate cases comprises the sequential selection circuitry contained in the above-mentioned IBM 2909 data channel. Information regarding the current priority group, that group of SC's to be sequentially accessed currently, is supplied as shown by counter 220. When the state of counter 220 changes the group of SC's subject to sequential selection is correspondingly altered.

Figure 4:
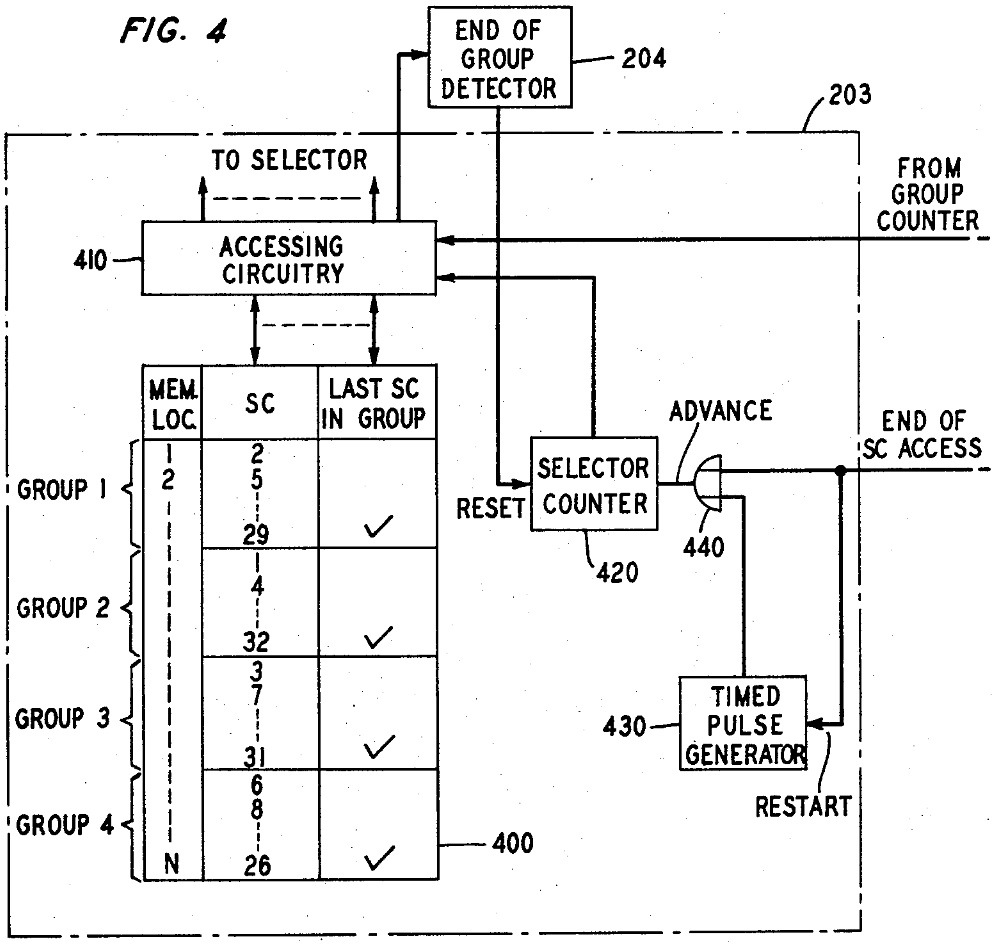
FIG. 4 shows means for directing the selection of subchannels in the circuit of FIG. 2.

A preferred embodiment of selector control circuit 203 is shown in FIG. 4. There, a memory 400 is shown storing information regarding the SC's associated with each priority group. Thus for a four-level grouping, memory 400 is seen to contain at consecutive individual memory locations indications of the SC's in each of the groups. Further, at the memory location corresponding to the last SC in each group a flag or similar indication is provided to permit the end of group detector 204 to identify and signal the conclusion of a group access.

Accessing of data stored in memory 400 is accomplished by standard accessing circuitry 410 under the control of signals from group counter 220 in FIG. 2 and selector counter 420 in FIG. 4. Counter 420 provides for the sequential accessing of memory locations associated with the current priority group. Thus selector circuit 200 is provided with a sequence of data signals indicating the SC to be connected to unit 100.

When a change in the state of group counter 220 occurs, the memory locations in memory 400 associated with the corresponding changed group are sequentially interrogated and their contents delivered to selector 200 in FIG. 2.

When an end of group flag is detected, counter 420 is reset to permit the accessing of the first location associated with the same or an updated group.

Counter 420 is in turn incremented by a signal from timed pulse generator 430. This latter generator, if not otherwise directed, provides a periodic pulse at a rate dictated by the required access times for the SC's. Thus, for the case illustrated in Tables II and III, a pulse is provided by generator 430 at 4 msec intervals. It may happen, of course, that each SC will not require the entire 4 msec interval at each access. Accordingly, a separate input lead is provided to selector control circuit 203 from unit 100 upon the termination of an access by a given SC. This is readily accomplished, for example, by detecting at a computer the occurrence of an "end of message" code delivered by a user to the computer. This additional input is paired with the output from generator 430 as an input to OR circuit 440 to provide the required advance signal to counter 420. Since generator 430 would not otherwise be aware of the beginning of a new SC access, a restart signal is derived from the "end of SC access" signal causing the advance.

The operation of the circuit of FIG. 2 is conveniently initialized by supplying a signal from unit 100 on lead 280 to reset counter 210 to the all-zero state. Counter 200 may also be initialized to the all-zero state to insure that the highest priority group receives the first group access.

GENERALIZATIONS

Although maximum service times were used in computing $r_i$ and $r^*_i$ above, it should be understood that average service times (or other statistically meaningful measures, e.g., most frequent service time, etc.) may be used as well. Thus in the above discussion $t_i$ may be taken to be the desired service time assigned, rather than merely the maximum time.

The values $n_i$ used above are to be determined by those employing the present invention. Thus it will be recognized in particular cases that the highest priority SC's must each receive service at least $L_i$ times each second. If there are $N_i$ of these highest priority channels, then $n_i - N_iL_i$.

Further, the values $t_i$ need not be identical for each value of $i$. The desired service time associated with each priority group is readily used to determine the time to advance sequencing counter 210 in FIG. 2. Thus a selected one of a plurality of timed pulse generators may supply the required advance of counter 420 is FIG. 4. Alternately, the circuit of FIG. 5 may be used for this purpose.

Figure 5:
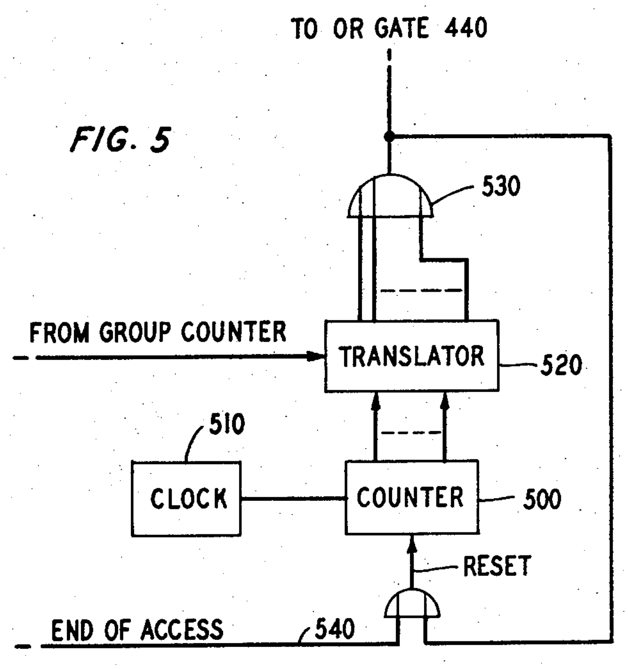
FIG. 5 shows an improved timing circuit for use in the circuit of FIG. 4.

FIG. 5 shows a circuit for generating periodic pulses having a period depending on the user priority group presently being served. Thus a counter 500 is advanced at rapid rate by clock 510. The outputs from counter 500 are applied to translator 520 as are inputs indicating the state of group counter 220. These inputs are translated in standard fashion by translator 520 to provide an output pulse when the count of counter 500 achieves a state corresponding to a desired duration for each SC priority group. The outputs from translator 520 are applied to an OR gate 530, thence to counter 420 in the circuit of FIG. 4. Counter 500 is, of course, reset whenever a count corresponding to a currently appropriate time interval is reached. When a SC access requires less than the assigned interval, $t_i$, counter 500 is reset by an "end of access" signal on lead 540 from the unit being accessed.

The above-described embodiments of the present invention are intended to be merely illustrative. Numerous and various other embodiments will occur to those skilled in the arts. It is noted in particular that all or some of the circuit functions specified above may be performed on a digital computer programmed in a manner obvious in light of the above disclosure. Further, although physically separate subchannels (inputs) are described above, the required plurality of subchannels may as well be separated in frequency or time on a single physical channel, i.e., the inputs may be separated in the manner of well-known frequency or time-division multiplex techniques.

While a special memory 400 and associated access and control circuitry is shown in FIG. 4 to provide great flexibility in accessing SC's within a group, it should be understood that special purpose wired accessing circuitry may be provided when such flexibility is not required. In particular, a bank of flip flops (one per SC) or a ring counter may be associated with each group to repetitively control access to the SC's. In the case of the bank of flip flops, for example, the SC currently being served is indicated by having only its associated flip flop assume a 1 condition. Upon completion of an SC access, the flip flop is reset, thereby generating a signal causing the flip flop for the next SC to be served to be switched to a 1 condition, and so forth. The "end of group access" signal is then readily generated by detecting the resetting of the flip flop associated with the last SC in a group.

While the SC's as described above have been classified in accordance with their association with a single level of groups, further ordering and structuring is often possible and desirable. Thus for example a given group, say group 1 in the above discussion, may be broken into two or more subgroups, each of which may be considered a "group" in the sense of having an associated state in a subgroup counter and an assigned number of subgroup accesses relative to other subgroups in group 1. Thus there may be created groups 1A, 1B, . . . . Similarly, the subgroups may have subsubgroups and so forth.

What is claimed is:

1. A selection circuit for connecting each of N inputs, N ≥ 2, to a single output at least once during a predetermined reference time interval comprising first means for selecting at least once during said reference interval each of a plurality of predetermined groups of said inputs, said plurality of groups comprising all of said N inputs, and second means for connecting each input in a selected group to said output in a predetermined manner.

2. The circuit of claim 1 wherein said groups are mutually exclusive, said inputs being included in respective groups in accordance with a desired priority structure, inputs in a given group each having the same priority, and wherein said first means comprises means for selecting a particular group a predetermined number of times during said reference interval, which number is uniquely associated with said particular group and is determined by the relative priority associated with said particular group.

3. The circuit of claim 1 wherein the totality of inputs in the ith group ($i = 1,2,3, \ldots, m$) is determined to require $n_i$ connections to said output during said reference interval, each of said connections continuing for not more than a period of time indicated by $t_i$ and wherein said means for selecting a particular group comprises means for selecting the ith group a number of times given approximately by $(n_i t_i)/(n_i t_i)_{min}$, $(n_i t_i)_{min}$ being the minimum value of $n_i t_i$ over all values of $i$.

4. The circuit of claim 2 wherein said means for selecting a particular group comprises a first counter for indicating the group currently selected, and a second counter for indicating the number of times during said reference interval that said currently selected group has been selected.

5. The circuit of claim 4 further comprising means for generating a first advance signal whenever each input in said currently selected group has been connected to said output, and means for applying said first advance signal to said second counter to increase the count of said second counter.

6. The circuit of claim 4 further comprising means for generating a second advance signal whenever said second counter indicates that said particular group has been selected said predetermined number of times, means for applying said second advance signal to said first counter to increase the count of said second counter, and means for applying said second advance signal to said second counter to reset said second counter to an initialized state.

7. The circuit of claim 1 wherein said second means comprises means for sequentially selecting each input in a selected group to said output.

8. The circuit of claim 6 wherein said second means comprises means for sequentially selecting each input in a selected group to said output.

9. The circuit of claim 8 wherein said means for sequentially selecting comprises a memory having a plurality of locations for storing in groups of successive locations information identifying the inputs associated with corresponding groups of inputs, said memory also storing information indicating which input in each group of inputs is the last input in that group to be connected to said output, means for accessing said information in said memory under the control of applied selection signals, a third counter for generating selection signals indicating the memory location containing the information identifying a current input to be connected to said output, and means responsive to information accessed from said memory for connecting said current input to said output.

10. The circuit of claim 9 further comprising means for generating a first signal whenever it is determined that said current input has completed its required period of connection to said output, means for generating a second signal whenever the period of connection for said current input to said output is equal to or greater than the value $t_i$, where said current input is included in the ith group of inputs, and means for advancing the count of said third counter in response to either of said first or second signals.

11. A method for connecting each of N inputs, N ≥ 2, to a signal output at least once during predetermined a reference time interval comprising the steps of 1. selecting at least once during said reference interval each of the plurality of groups of said inputs, said plurality of predetermined groups comprising all of said N inputs, and 2. connecting each input in a selected group to said output in a predetermined manner.

12. The method of claim 11 wherein said groups are mutually exclusive, said inputs being included in respective groups in accordance with a desired priority structure, inputs in a given group each having the same priority, and wherein said step (1) comprises selecting a particular group a predetermined number of times during said reference interval, which number is uniquely associated with said particular group and is determined by the relative priority associated with said particular group.

13. The method of claim 11 wherein the totality of inputs in the ith group ($i = 1,2,3, \ldots, m$) is determined to require $n_i$ connections to said output during said reference interval, each of said connections continuing for not more than a period of time indicated by $t_i$ and wherein said selecting of a particular group comprises selecting the ith group a number of times given approximately by $(n_i t_i)/(n_i t_i)_{min}$, $(n_i t_i)_{min}$ being the minimum value of $n_i t_i$ over all values of $i$.

14. The method of claim 11 wherein said step (2) comprises sequentially selecting each input in a selected group to said output.

* * * * *